United States Patent
Lee et al.

(10) Patent No.: US 10,838,762 B2
(45) Date of Patent: Nov. 17, 2020

(54) METHOD AND DEVICE FOR LIVE MIGRATION OF VIRTUAL MACHINE IN A MULTI-ROOT I/O VIRTUALIZATION ENVIRONMENT AND COMPUTING HOST THEREOF

(71) Applicant: Industrial Technology Research Institute, Hsinchu (TW)

(72) Inventors: Chao-Tang Lee, Pingtung County (TW); Tai-Hua Hsiao, Hsinchu (TW); Cheng-Chun Tu, Hsinchu County (TW); Peng-Kai Hsu, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 257 days.

(21) Appl. No.: 15/851,331

(22) Filed: Dec. 21, 2017

(65) Prior Publication Data
US 2019/0163521 A1 May 30, 2019

(30) Foreign Application Priority Data
Nov. 30, 2017 (TW) .............................. 106141850 A (51) Int. Cl.
*G06F 9/44* (2018.01)
*G06F 9/48* (2006.01)
(Continued)

(52) U.S. Cl.
CPC ........ *G06F 9/4856* (2013.01); *G06F 9/45558* (2013.01); *G06F 12/1009* (2013.01);
(Continued)

(58) Field of Classification Search
CPC ...................................................... G06F 9/44
See application file for complete search history.

(56) References Cited

U.S. PATENT DOCUMENTS 8,146,082 B2 3/2012 Belay
2011/0252173 A1* 10/2011 Armstrong .......... G06F 13/4027
710/305
(Continued)

FOREIGN PATENT DOCUMENTS

CN 104094230 A 10/2014
CN 102707991 B 3/2016
(Continued)

OTHER PUBLICATIONS

Taiwan Patent Office, Office Action, Patent Application Serial No. 106141850, dated Jul. 25, 2018, Taiwan.
(Continued)

*Primary Examiner* — Jae U Jeon (57) ABSTRACT

A method for live migration of a virtual machine in a MR-IOV environment is provided. The method is used in a system, wherein the system includes a plurality of computing hosts, an MR-IOV device, and a management host including a physical function and configured to implement a plurality of virtual functions. Eand each computing host and the management host are coupled to the MR-IOV device. The method includes: migrating, by a source computing host of the computing hosts, a source virtual machine in the source computing host to a destination VM in a destination computing host of the computing hosts, wherein the source VM includes a source VF; transmitting, by the destination computing host, a request message to a management host and reassigning, by the management host, a first VF corresponding to the source VF in the management host to the destination VM according to the request message.

16 Claims, 10 Drawing Sheets

(51) Int. Cl.
G06F 9/455 (2018.01)
G06F 13/16 (2006.01)
G06F 12/1009 (2016.01)
G06F 13/42 (2006.01)

(52) U.S. Cl.
CPC ...... *G06F 13/1673* (2013.01); *G06F 13/4282* (2013.01); *G06F 2009/4557* (2013.01); *G06F 2009/45579* (2013.01); *G06F 2009/45583* (2013.01); *G06F 2212/65* (2013.01); *G06F 2213/0026* (2013.01)

(56) References Cited

U.S. PATENT DOCUMENTS

| | | | |
|---|---|---|---|
| 2012/0159481 A1* | 6/2012 | Anderson | G06F 9/45558 718/1 |
| 2012/0254862 A1 | 10/2012 | Dong | |
| 2013/0151685 A1 | 6/2013 | Bursell | |
| 2013/0166814 A1* | 6/2013 | Tamura | G06F 9/45533 711/3 |
| 2015/0032910 A1* | 1/2015 | Ben Yehuda | G06F 13/4221 710/15 |
| 2015/0154042 A1* | 6/2015 | Katayama | G06F 9/45533 718/1 |
| 2017/0070363 A1* | 3/2017 | Watkins | H04L 12/423 |

FOREIGN PATENT DOCUMENTS

| | | |
|---|---|---|
| TW | 201617918 | 5/2016 |
| TW | I598740 B | 9/2017 |

OTHER PUBLICATIONS

Xu et al., "SRVM: Hypervisor Support for Live Migration with Passthrough SR-IOV Network Devices," VEE '16, Apr. 2016, pp. 65-77, ACM, US.

Clark et al., "Live Migration of Virtual Machines," NSDI '05 Proceedings of the 2nd conference on Symposium on Networked Systems Design & Implementation, May 2005, 14 pages, vol. 2, ACM, US.

"Intel 82599 SR-IOV Driver Companion Guide." May 2010, 44 pages, Intel, US.

* cited by examiner

METHOD AND DEVICE FOR LIVE MIGRATION OF VIRTUAL MACHINE IN A MULTI-ROOT I/O VIRTUALIZATION ENVIRONMENT AND COMPUTING HOST THEREOF

CROSS REFERENCE TO RELATED APPLICATIONS

This application claims priority from Taiwan Patent Application No. 106141850, filed on Nov. 30, 2017, the disclosure of which is incorporated herein by reference in their entirety.

BACKGROUND

Technical Field

The disclosure relates to a virtualization technique of a computer system, and more particularly, it relates to a method and a device for live migration of a virtual machine in a multi-root I/O virtualization (MR-IOV) environment, and a computing host thereof.

Description of the Related Art

A computer system (e.g., a desktop or laptop computer) requires a bus to perform data transmission with a peripheral component. With the rapid development of serial communication technology, peripheral component interconnection express (PCIe)—having the advantage of a high transmission rate—is gradually replacing peripheral component interconnection (PCI) and becoming the dominant transmission interface for peripheral components.

In recent years, due to the rapid progress in the development of the Internet, user demand for information services has grown, which has imposed a heavy burden on servers. Therefore, in order to reduce costs and use resources efficiently, server virtualization technology has gradually become a trend. In terms of the specification of PCIe, single root I/O virtualization (SR-IOV) is one effective solution for server virtualization. The SR-IOV technology allows a physical host (e.g. computer host) to assign multiple virtual functions (VF) to different virtual machines (VM). However, SR-IOV technology is limited and can only support one single physical host. In other words, multiple virtual machines in one physical host can use virtual functions simultaneously, but the virtual functions cannot be assigned to virtual machines in different physical hosts at the same time. By contrast, multi-root I/O virtualization (MR-IOV) technology can virtualize hardware resources to support multiple physical hosts.

Live migration typically involves the ability to move a VM from a source physical machine to a destination physical machine without affecting correctness of processing by the VM and without significantly affecting the availability of the VM. There are a variety of methods for performing live migration. Pass-through network devices are often used to perform live migration of VMs. However, live migration imposes a challenge in pass through devices, especially while migrating VFs supporting MR-IOV. For example, (1) the hypervisor controlled by the direct network device cannot save and restore the hardware status; (2) during live migration, the application receiving network packets in the direct network device may suffer from data loss when received data are not properly handled; (3) after live migration, the destination host must configure a new network interface card (NIC) for the migrated VM. But the NIC driver still has the original driver status; and (4) the VF needs to be reset to synchronize the driver and hardware status after live migration.

Hence, it is necessary to develop a method and a device for live migration of a virtual machine in a multi-root I/O virtualization (MR-IOV) environment, and a computing host thereof is needed to complete the driver and hardware status of an original VF in a new VM.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a device for live migration of a virtual machine in a multi-root I/O virtualization (MR-IOV) environment, and a computing host thereof are provided in the disclosure.

In an embodiment, a method for live migration of a virtual machine in a multi-root I/O virtualization (MR-IOV) environment is provided in the disclosure. The method is used in a system, wherein the system at least comprises a plurality of computing hosts, an MR-IOV device and a management host including a physical function (PF) and configured to implement a plurality of virtual functions (VF), and each computing host and the management host are communicatively coupled to the MR-IOV device. The method comprises: migrating, by a source computing host of the computing hosts, a source virtual machine (VM) in the source computing host to a destination VM in a destination computing host of the computing hosts, wherein the source VM includes a source VF; transmitting, by the destination computing host, a request message to a management host; and reassigning, by the management host, a first VF corresponding to the source VF in the management host to the destination VM according to the request message.

In some embodiments, after the source computing host migrates the source VM to the destination VM, the method further comprising: transmitting, by the source computing host, a notification message to the management host to notify the management host that the source computing host has de-allocated the source VM.

In some embodiments, after the source computing host migrates the source VM to the destination VM, the method further comprising: transmitting, by the source computing host, a configuration message to the destination computing host; and remapping, by a hypervisor controlled by the destination computing host, the configuration information to an extended page table (EPT) of the destination computing host.

In some embodiments, the configuration information at least comprises: PCIe ID, configuration space, control and status register (CSR) addresses, Rx ring buffer addresses, Tx ring buffer addresses, Rx packet buffer addresses, and Tx packet buffer addresses.

In an embodiment, a system for live migration of a virtual machine in a multi-root I/O virtualization (MR-IOV) environment is provided in the disclosure. The system comprises an MR-IOV device, a plurality of computing hosts and a management host. Each computing host is communicatively coupled to the MR-IOV device via a PCIe link. The management host comprises a physical function (PF) and is configured to implement a plurality of virtual functions (VF). The management host is communicatively coupled to the MR-IOV device via a PCIe slot of the MR-IOV device. A source computing host of the computing hosts migrates a source virtual machine (VM) in the source computing host to a destination VM in a destination computing host of the computing hosts, wherein the source VM includes a source VF. The source computing host transmits a request message to the management host, and the management host reassigns a first VF corresponding to the source VF in the management host to the destination VM according to the request message.

In an embodiment, a method for live migration of a virtual machine in a multi-root I/O virtualization (MR-IOV) environment is provided in the disclosure. The method is used in a computing host. The method comprises: controlling a hypervisor to migrate a source virtual machine (VM) including a source virtual function (VF) in the computing host to a destination VM in a destination computing host; and transmitting a configuration message to the destination computing host, wherein the computing host and the destination computing host are coupled to an MR-IOV device to communicate with a management host.

In an embodiment, a computing host for live migration of a virtual machine in a multi-root I/O virtualization (MR-IOV) environment is provided in the disclosure. The computing host comprises one or more processors and one or more computer storage media, storing one or more computer-readable instructions, wherein the processor is configured to drive the computer storage media to execute the following tasks: controlling a hypervisor to migrate a source virtual machine (VM) including a source virtual function (VF) in the computing host to a destination VM in a destination computing host; and transmitting a configuration message to the destination computing host, wherein the computing host and the destination computing host are coupled to an MR-IOV device to communicate with a management host.

In an embodiment, a method for live migration of a virtual machine in a multi-root I/O virtualization (MR-IOV) environment is provided in the disclosure. The method is used in a computing host. The method comprises: controlling a hypervisor to migrate a source virtual machine (VM) including a source virtual function (VF) in a source computing host to a destination VM in the computing host; transmitting a request message to a management host to request the management host to reassign a first VF corresponding to the source VF in the management host to the destination VM according to the request message, wherein the source computing host and the computing host are coupled to an MR-IOV device to communicate with the management host.

In an embodiment, a computing host for live migration of a virtual machine in a multi-root I/O virtualization (MR-IOV) environment is provided in the disclosure. The computing host comprises one or more processors and one or more computer storage media, storing one or more computer-readable instructions, wherein the processor is configured to drive the computer storage media to execute the following tasks: controlling a hypervisor to migrate a source virtual machine (VM) including a source virtual function (VF) in a source computing host to a destination VM in the computing host; transmitting a request message to a management host to request the management host to reassign a first VF corresponding to the source VF in the management host to the destination VM according to the request message, wherein the source computing host and the computing host are coupled to an MR-IOV device to communicate with the management host.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

The system for live migration of a virtual machine in a MR-IOV environment according to exemplary embodiments of the disclosure may provide a physical function (PF)

for management and a plurality of virtual functions (VFs) to a host. In this case, at least one VF may be assigned to one VM.

Figure 1:
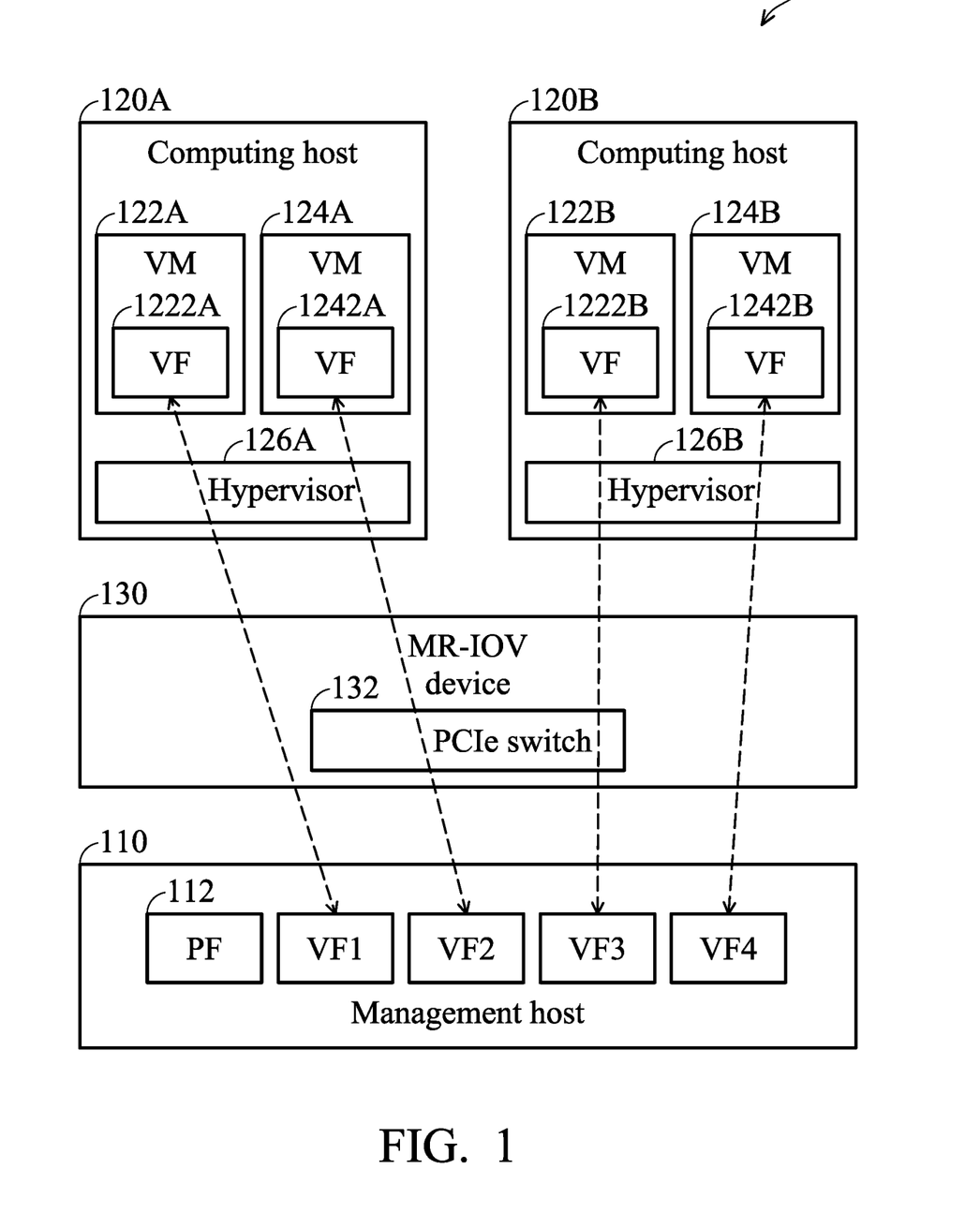
FIG. 1 shows a schematic diagram illustrating a system used in an MR-IOV environment in accordance with one embodiment of the disclosure.

FIG. 1 shows a schematic diagram illustrating a system 100 used in an MR-IOV environment in accordance with one embodiment of the disclosure.

As shown in FIG. 1, the system 100 at least comprises a plurality of computing hosts (a computing host 120A and a computing host 120B), a management host 110 and an MR-IOV device 130. It should be noted that standard server technology is suitable for implementation in the context of the MR-IOV environment of the present disclosure. In this sense, any suitable server technology known in the art may be implemented as one of the plurality of computing hosts or the management host of the present disclosure.

The computing host 120A and the computing host 120B may comprise a plurality of VMs, respectively (e.g. VMs 122A, 124A, 122B and 124B). The number of VMs can vary according to the particular application and use(s) of the computing host. One or more hypervisors (or virtual machine managers (VMMs)) 126A and 126B can manage communications from the VMs 122A, 124A, 122B and 124B to external resources. This management can facilitate the running of multiple operating systems on shared hardware (e.g., a central processing unit (CPU)). The hypervisors 126A and 126B can provide the different instances of operating systems with access to the memory, processor(s) and other resources of the computing hosts 120A and 120B. For instance, the hypervisors 126A and 126B can control the processor and resources of the computing hosts 120A and 120B in order to allocate what is needed by the VMs 122A, 124A, 122B and 124B.

VMs 122A, 124A, 122B and 124B can comprise one or more software device drivers (or just "drivers") (not shown in FIG. 1). The drivers can allow other software applications to be provided with access to one or more VFs (e.g. VFs 1222A, 1242A, 1222B and 1242B). The VFs 1222A, 1242A, 1222B and 1242B can be linked to the management host 110. For instance, the management host 110 can provide one or more VFs (e.g., VF1, VF2, VF3 and VF4). Access to the VFs by the drivers can be accomplished by reading or writing to a particular address range that has been reserved for the VFs.

The management host 110 can comprise at least a PF 112 and a plurality of VFs (e.g., VF1, VF2, VF3 and VF4).

The MR-IOV device 130 may comprise, but is not limited to, a PCIe switch 132. The PCIe switch 132 may include a plurality of ports P1, P2 and up to and including PN (not shown in FIG. 1).

Furthermore, each of the computing hosts 120A and 120B may individually be coupled to the MR-IOV device 130 via an interconnection link (e.g., interconnection cables). For example, the interconnection link may include a PCI Express (PCIe) cable. In this regard, the MR-IOV device 130 is configured to assign the VF1, VF2, VF3 and VF4 of the management host 110 to the computing hosts 120A and 120B through PCIe communication.

Upon interconnection of the management host 110 with the MR-IOV device 130, a physical function driver of the management host 110 may be executed. Then, the executed PF driver may be utilized to create a plurality of virtual functions VF1 through VF4. The MR-IOV device 130 may then assign each of the virtual functions VF1 through VF4 to an individual computing host 120A or 120B. As shown in FIG. 1, the virtual functions VF1 to VF4 in the management host 110 may be respectively assigned to the VFs 1222A, 1242A, 1222B and 1242B included in the VMs 122A, 124A, 122B and 124B of the computing hosts 120A and 120B.

FIGS. 2A-2D are schematic diagrams illustrating live migration of a VM in an MR-IOV environment in accordance with an embodiment of the present disclosure.

Figure 2A:
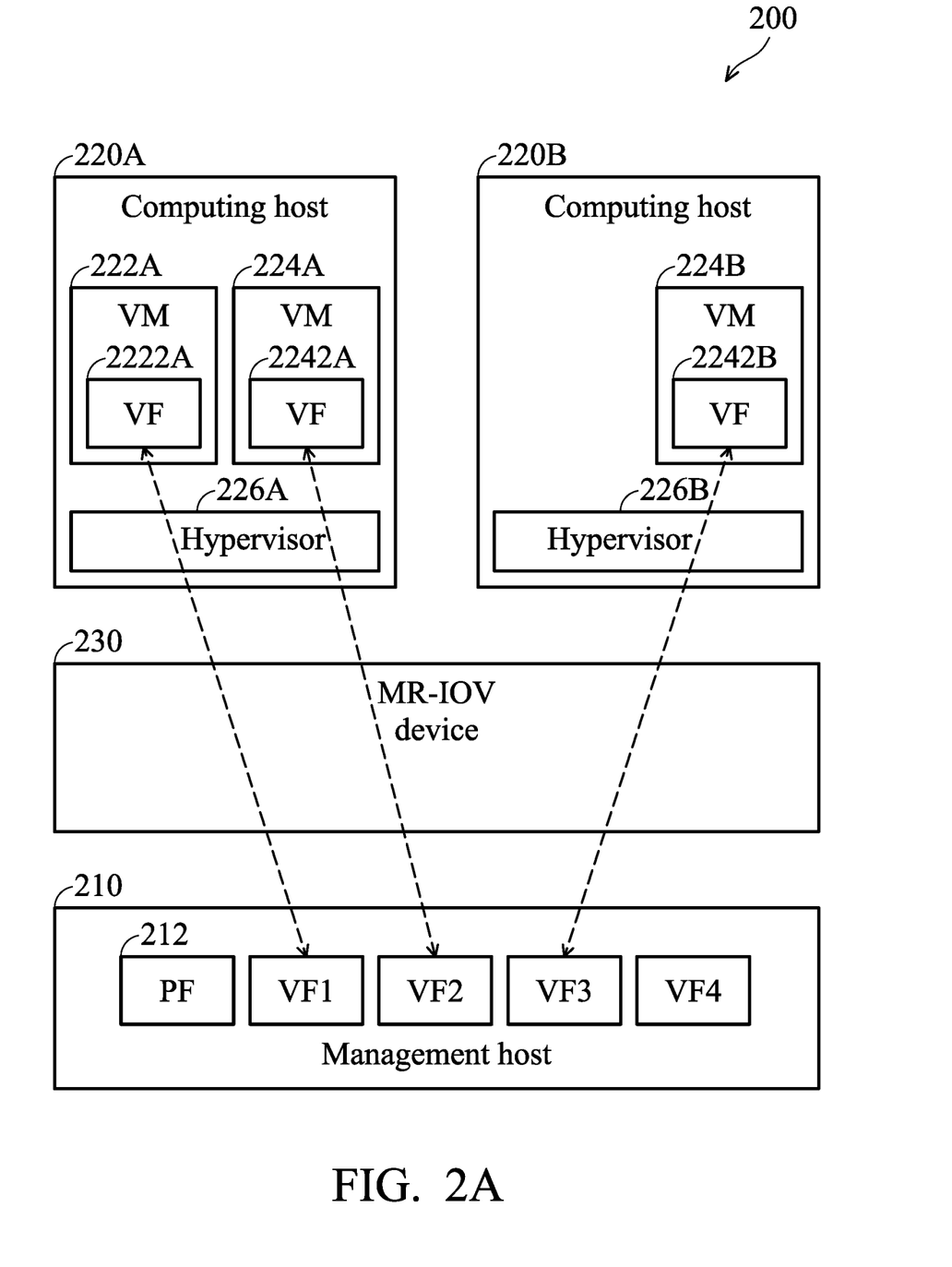
FIGS. 2A-2D are schematic diagrams illustrating live migration of a VM in an MR-IOV environment in accordance with an embodiment of the present disclosure.

FIG. 2A is a schematic diagram illustrating a virtualization environment before a VM live migration in accordance with an embodiment of the present disclosure. As shown in FIG. 2A, the system 200 can comprise a plurality of computing hosts (e.g. a source computing host 220A and a destination computing host 220B), a MR-IOV device 230 and a management host 210 including a PF 212 and configured to implement a plurality of virtual functions VF1, VF2, VF3 and VF4, wherein each one of the computing hosts 220A and 220B and the management host 210 are communicatively coupled to the MR-IOV device 230. The source computing host 220A comprises a hypervisor 226A, and the source computing host 220B comprises a hypervisor 226B.

In addition, source VMs 222A and 224A of the source computing host 220A may have source VFs 2222A and 2242A, respectively. A destination VM 224B of the destination computing host 220B may have a destination VF 2242B. The VF1, VF2 and VF3 of the management host 210 are respectively assigned to the source VFs 2222A and 2242A included in the source VMs 222A and 224A in the source computing host 220A and the destination VF 2242B included in the source VM 224B in the destination computing host 220B.

As shown in FIG. 2A, the hypervisor 226A of the source computing host 220A may initiate the migration of the source VM 224A to the computing host 220B.

Figure 2B:
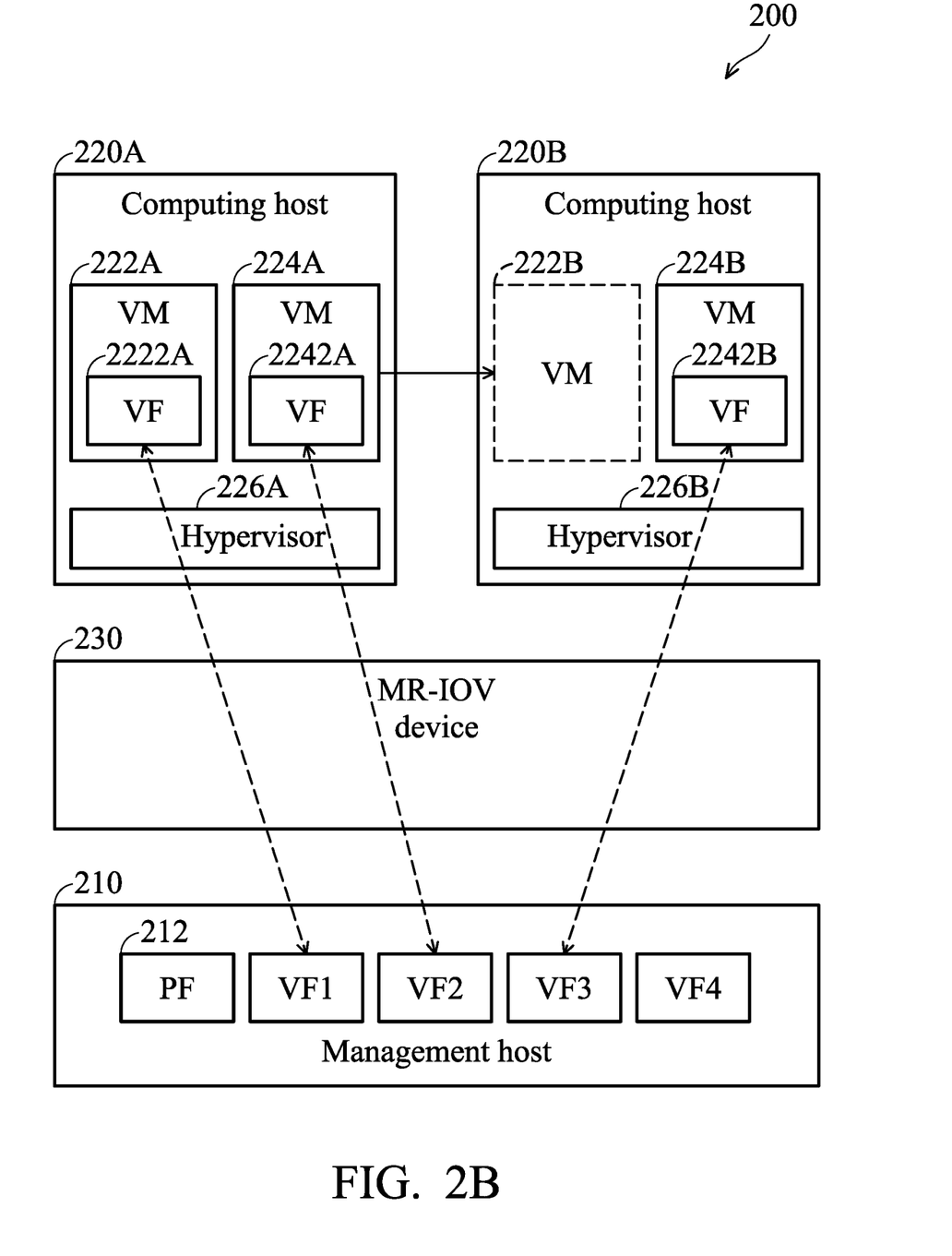

Then, as shown in FIG. 2B, the VM migration can be performed by synchronizing the dirty pages (memory), including the I/O virtual memory, between the source computing host 220A and the destination computing host 220B.

Figure 2C:
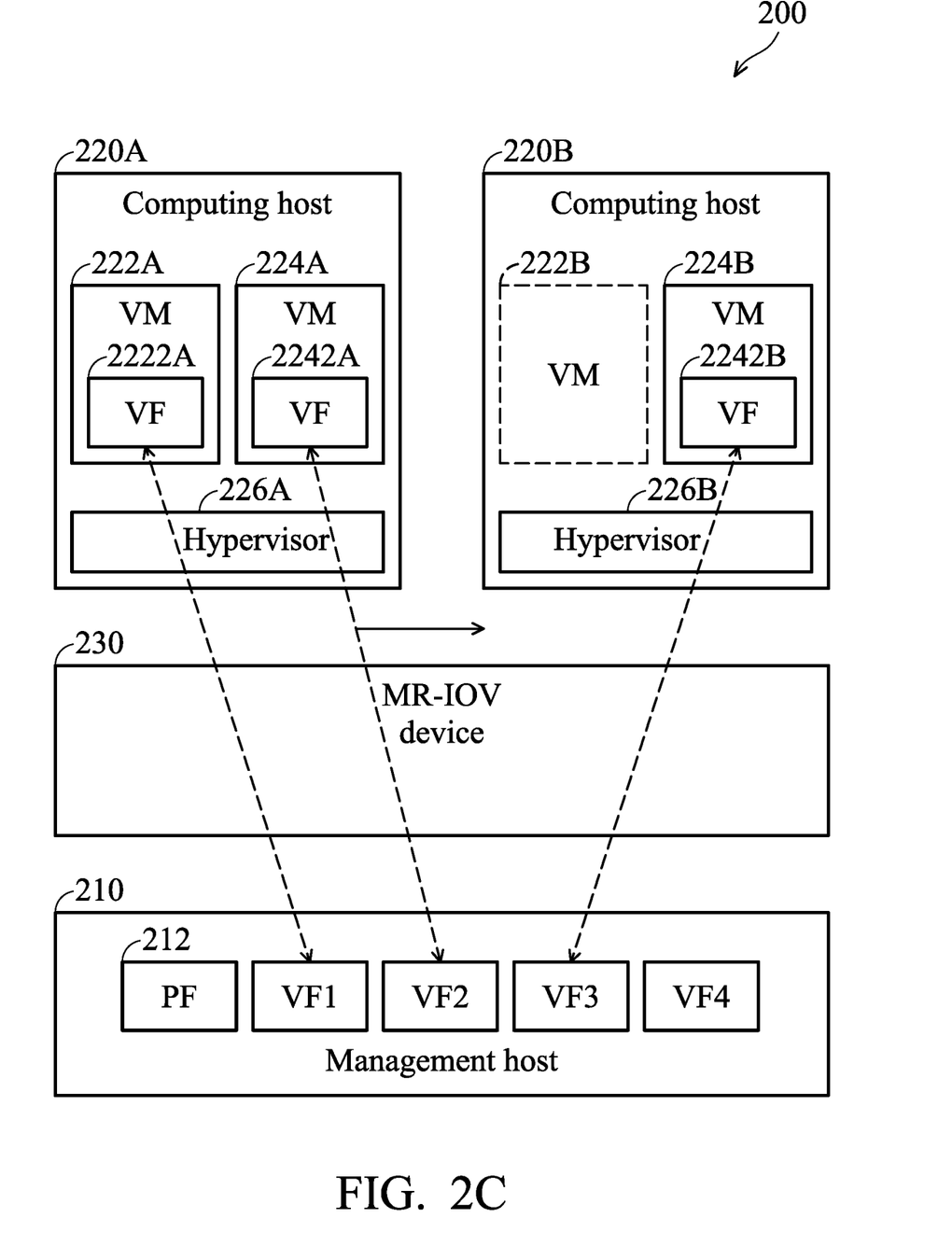

Next, the source computing host 220A migrates the source VM 224A to the destination VM 222B, and the destination computing host 220A may transmit a request message to the management host 210 to request the management host 210 to reassign a VF2 corresponding to the source VF 2242A in the management host 210 to the destination VM 222B in the destination computing host 220B, as shown in FIG. 2C.

In an embodiment, the source computing host 220A may further transmit a notification message to the management host 210 to notify the management host 210 that the source computing host 220A has de-allocated the source VM 224A after the source computing host 220A migrates the source VM 224A to the destination VM 222B.

Figure 2D:
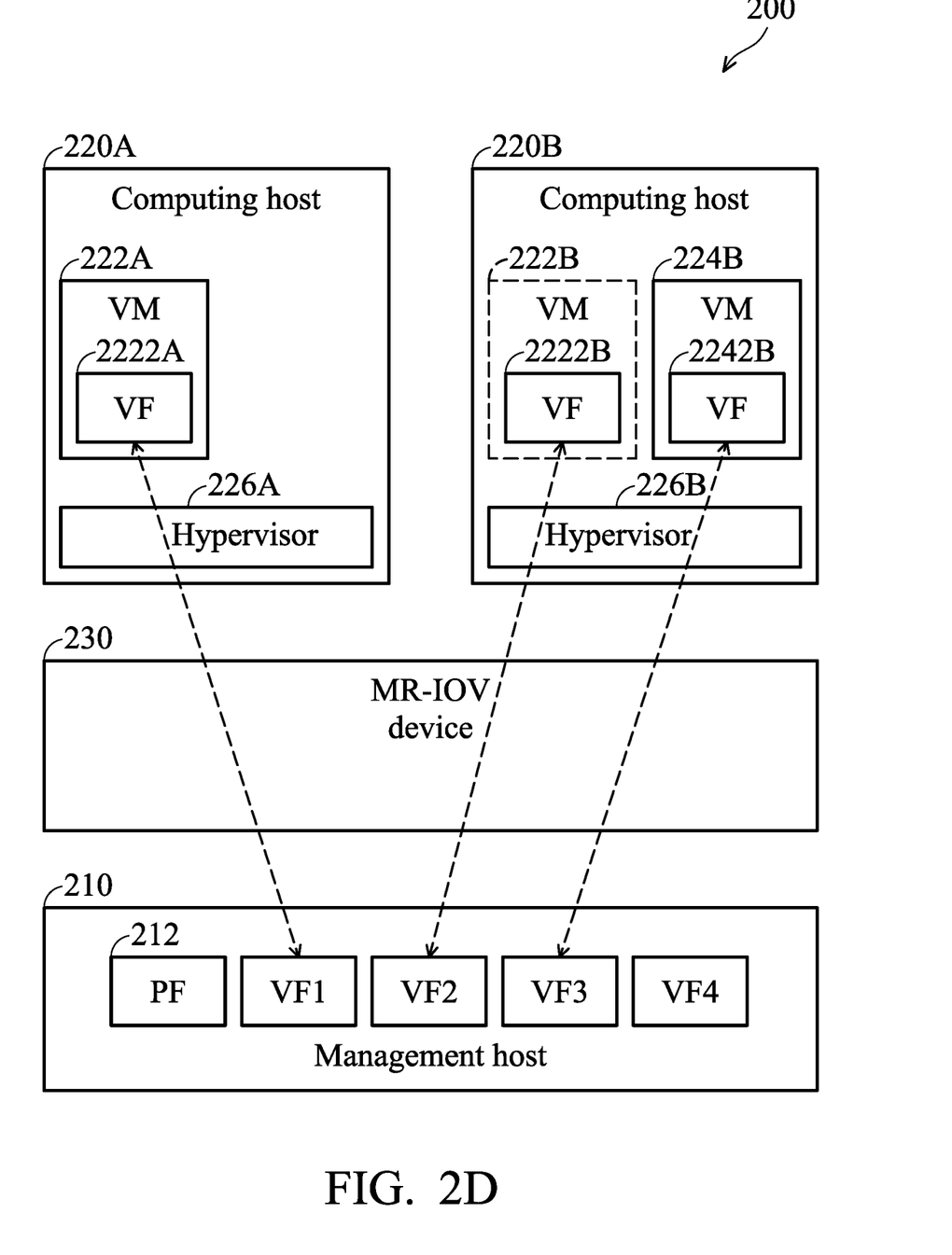

The management host 210 may then reassign the VF2 corresponding to the source VF 2242A in the management host 210 to the destination VM 224B according to the request message. FIG. 2D is a schematic diagram illustrating a virtualized environment after the VM live migration in accordance with an embodiment of the present disclosure. As shown in FIG. 2D, after migrating the source VM 224A to the destination computing host 220B, the destination VM 222B may have a new VF 2222B, and the destination VM 222B has the same memory information as the source VM 224A. In addition, the VF2 in the management host 210 may be assigned to the new VF 2222B included in the destination VM 222B of the destination computing host 220B. Since the management host 210 reassigns the same VF2 to the new VF 2222B, the destination computing host 220B may keep the same information of the driver and hardware status.

In an embodiment, after the source computing host 220A migrates the source VM 224A to the destination VM 222B, the source computing host 220A may transmit a configuration message to the destination computing host 220B, wherein the configuration message at least comprises:

PCIe ID;

configuration space;

control and status register (CSR) addresses (e.g., bus addresses, VM virtual addresses);

interrupt request (IRQ) number;

Rx ring buffer addresses (e.g., bus addresses, VM virtual addresses);

Tx ring buffer addresses (e.g., bus addresses, VM virtual addresses);

Rx packet buffer addresses (e.g., bus addresses, VM virtual addresses);

Tx packet buffer addresses (e.g., bus addresses, VM virtual addresses); and mail box buffers.

After the destination computing host 220B receives the configuration message, the destination computing host 220B may control the hypervisor 226B to remap the configuration message to an extended page table (EPT) and an I/O memory management unit (IOMMU) of the destination computing host 220B. In the case of Intel systems, IOMMU is the Intel virtualization technology (VT-D).

Figure 3:
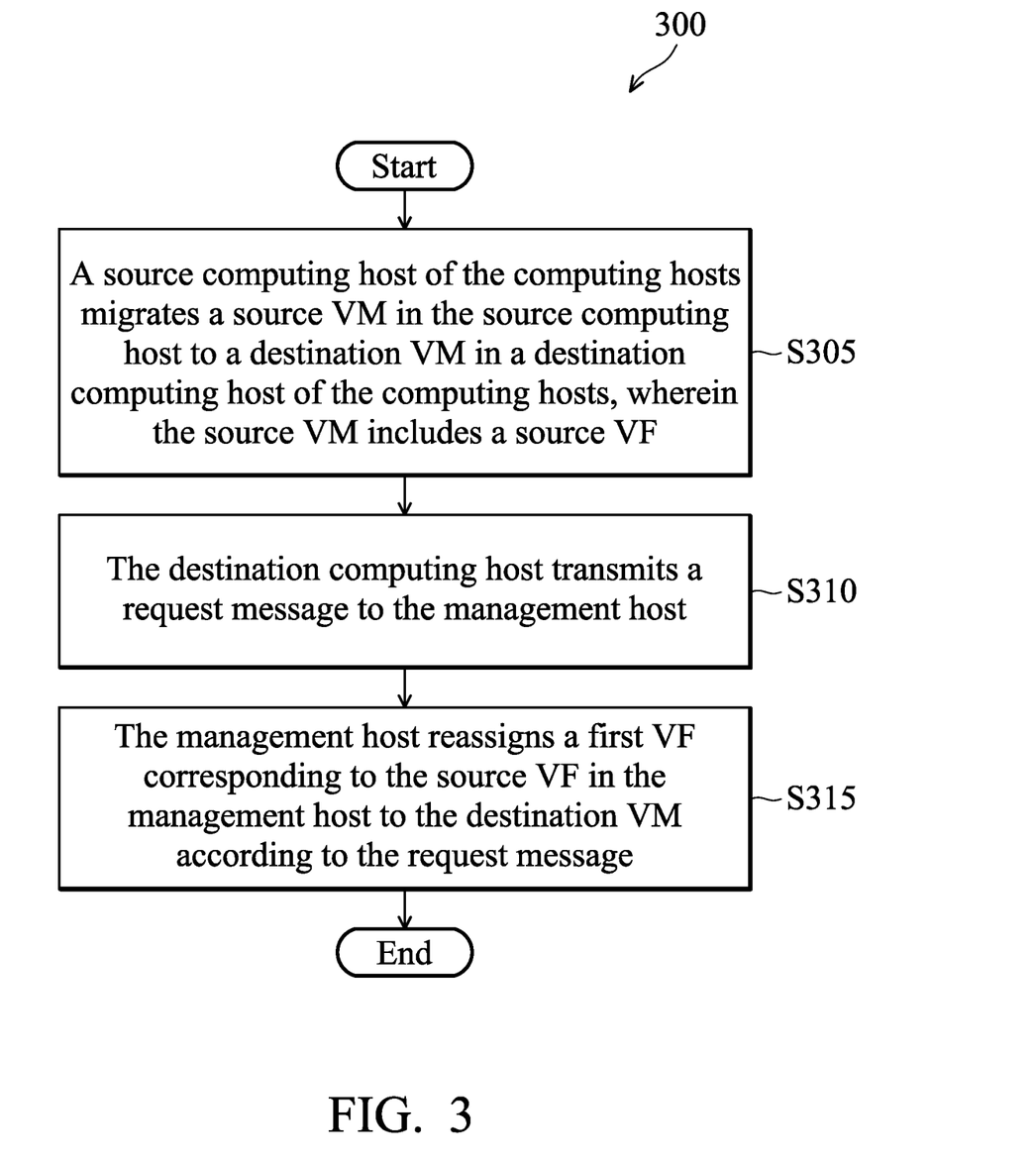
FIG. 3 is a flow diagram illustrating a method for live migration of a virtual machine in a multi-root I/O virtualization (MR-IOV) environment according to an embodiment of the present disclosure.

FIG. 3 is a flow diagram 300 illustrating a method for live migration of a virtual machine in a multi-root I/O virtualization (MR-IOV) environment according to an embodiment of the present disclosure. The method is used in the system 100 and 200 of FIG. 1 or FIGS. 2A~2D, wherein the system at least comprises a plurality of computing hosts, an MR-IOV device and a management host including a PF and configured to implement a plurality of VFs, and each computing host and the management host are communicatively coupled to the MR-IOV device.

In step S305, a source computing host of the computing hosts migrates a source VM in the source computing host to a destination VM in a destination computing host of the computing hosts, wherein the source VM includes a source VF. Then, in step S310, the destination computing host transmits a request message to the management host. In step S315, the management host reassigns a first VF corresponding to the source VF in the management host to the destination VM according to the request message.

Figure 4:
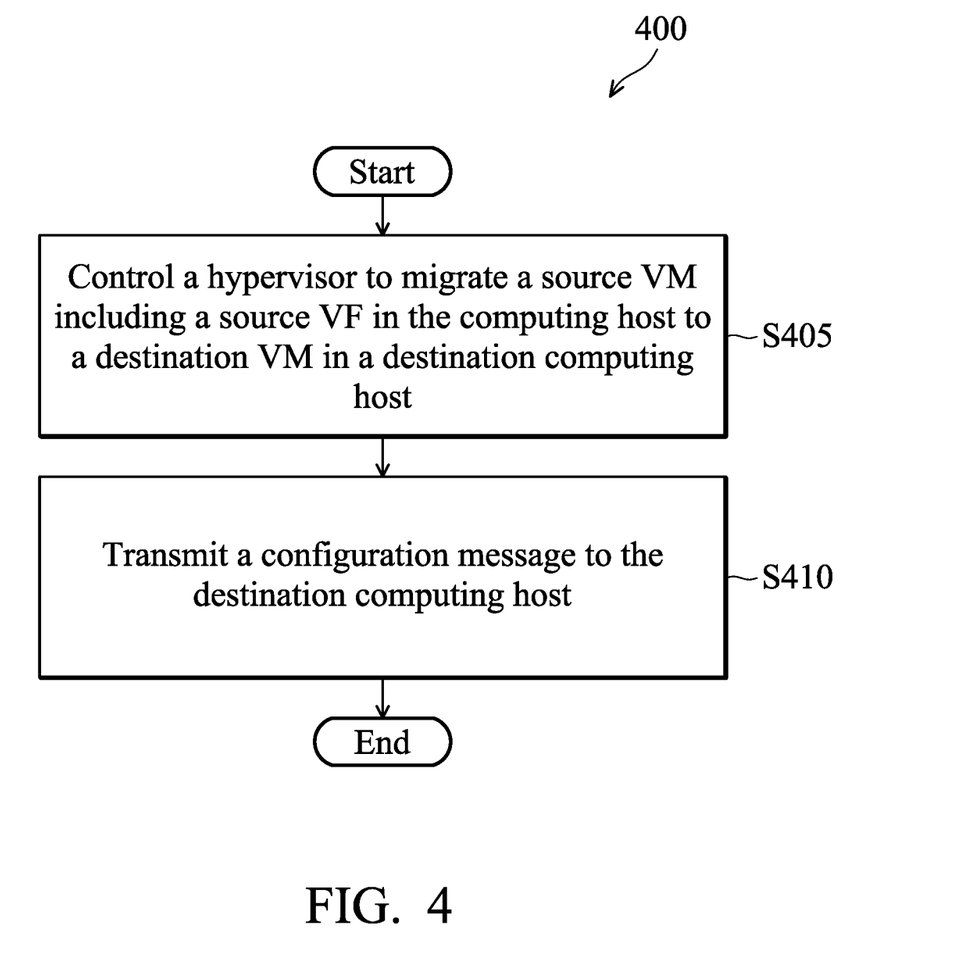
FIG. 4 is a flow diagram illustrating a method for live migration of a virtual machine in a multi-root I/O virtualization (MR-IOV) environment according to an embodiment of the present disclosure.

FIG. 4 is a flow diagram 400 illustrating a method for live migration of a virtual machine in a multi-root I/O virtualization (MR-IOV) environment according to an embodiment of the present disclosure. The method is used in a computing host of FIG. 1 or the source computing host 220A of FIGS. 2A~2D.

In step S405, the computing host controls a hypervisor to migrate a source VM including a source VF in the computing host to a destination VM in a destination computing host. In step S410, the computing host transmits a configuration message to the destination computing host, wherein the computing host and the destination computing host are coupled to an MR-IOV device to communicate with a management host.

In one embodiment, the source computing host may further transmit a notification message to the management host to notify the management host that the source computing host has de-allocated the source VM after migrating the source VM to the destination VM.

Figure 5:
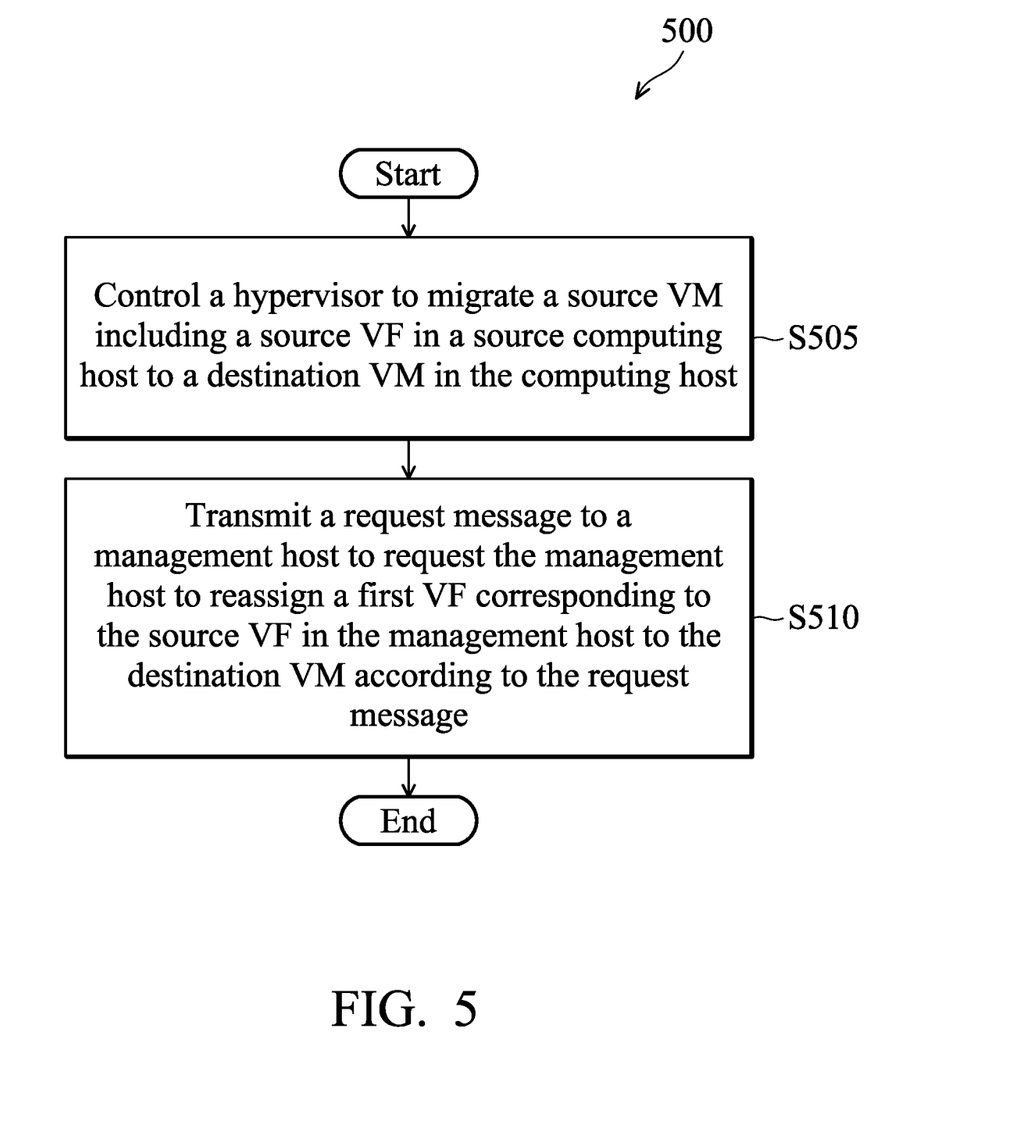
FIG. 5 is a flow diagram illustrating a method for live migration of a virtual machine in a multi-root I/O virtualization (MR-IOV) environment according to an embodiment of the present disclosure.

FIG. 5 is a flow diagram 500 illustrating a method for live migration of a virtual machine in a multi-root I/O virtualization (MR-IOV) environment according to an embodiment of the present disclosure. The method is used in a computing host of FIG. 1 or the destination computing host 220B of FIGS. 2A~2D.

In step S505, the computing host controls a hypervisor to migrate a source VM including a source VF in a source computing host to a destination VM in the computing host. In step S510, the computing host transmits a request message to a management host to request the management host to reassign a first VF corresponding to the source VF in the management host to the destination VM according to the request message, wherein the source computing host and the computing host are coupled to an MR-IOV device to communicate with the management host.

In one embodiment, the computing host may further receive a configuration message from the source computing host, and remap the configuration information to an extended page table (EPT) of the destination computing host after migrating the source VM to the destination VM.

Figure 6:
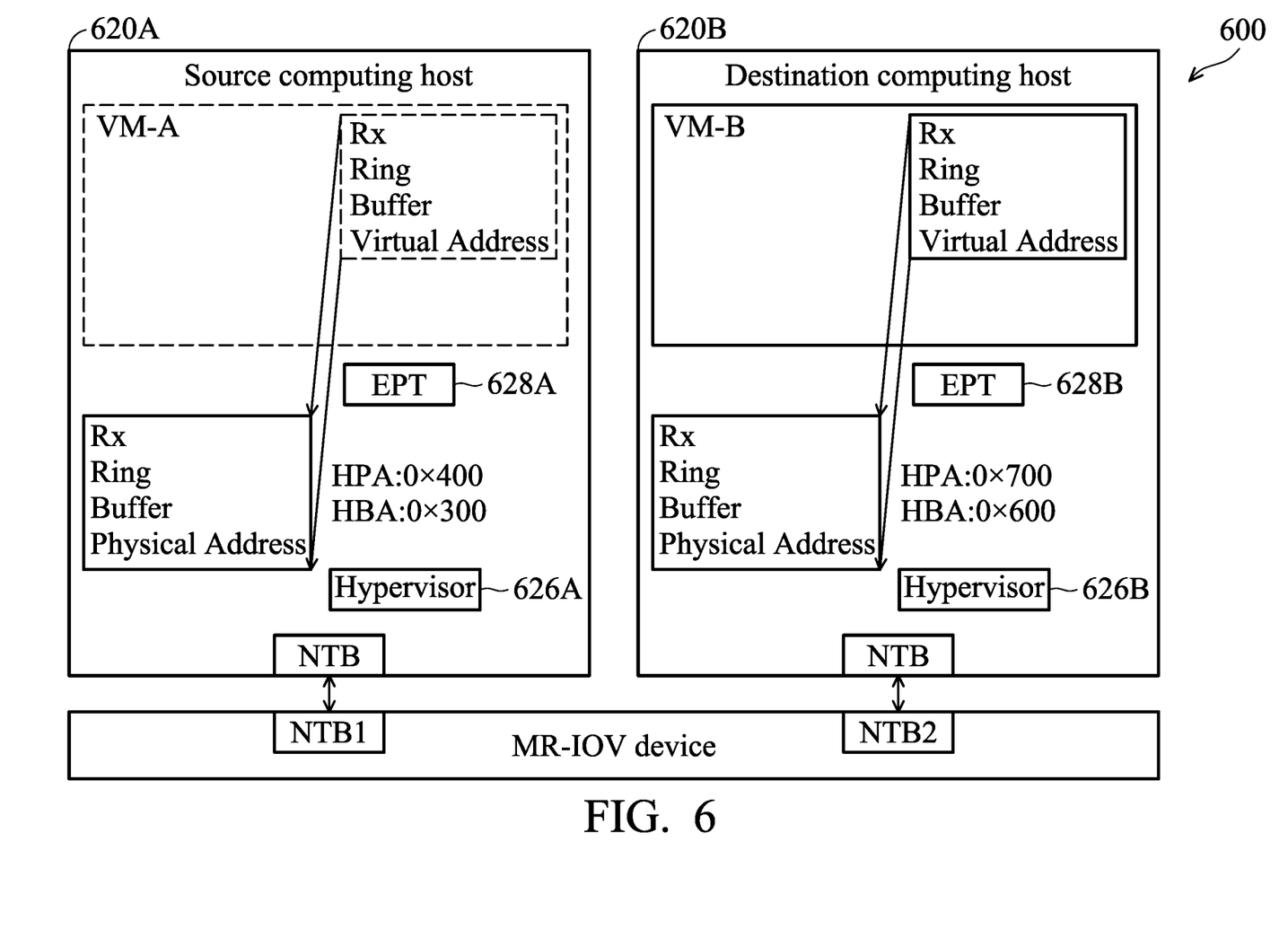
FIG. 6 is a schematic diagram illustrating how the destination computing host remaps the configuration message to an EPT according to an embodiment of the present disclosure.

FIG. 6 is a schematic diagram 600 illustrating how the destination computing host remaps the configuration message to an EPT according to an embodiment of the present disclosure. In FIG. 6, it is assumed that the source computing host 620A has migrated the source virtual machine VM-A to the destination virtual machine VM-B in the destination computing host 620B. For convenience of description, the source virtual machine VM-A in the source computing host 620A is indicated by a dotted line to describe the environment before the source virtual machine VM-A is migrated.

To support physical memory management, the source computing host 620A and the destination computing host 620B provide an extended page table (EPT) mechanism. The hypervisor 626A of the source computing host 620A and the hypervisor 626B of the destination computing host 620B may maintain address translation mappings between the virtual memory in the VM and the physical memory in the computing host by the EPT mechanism.

In FIG. 6, the EPT 628B of the source computing host 620A and the EPT 628B of the destination computing host 620B may record configuration information related to the address translation mappings. Table 1 shows the configuration message related to Rx ring buffer addresses in the EPT 628A of the source computing host 620A.

TABLE 1

| EPT 628A |
|---|
| Rx Ring Buffer Address HBA: 0 × 100 |
| 0 × 100 go to Hypervisor 626A |
| Hypervisor 626A transfers to HPA: 0 × 200 |
| 0 × 200 go to NTB1 |
| NTB1 transfers to HBA of Computing Host 620A: 0 × 300 |
| 0 × 300 go to Hypervisor 626A |
| Hypervisor 626A transfers to HPA: 0 × 400 |
| 0 × 400 is Rx Ring Buffer Address of Computing Host 620A |

As shown in Table 1, the hypervisor and the non-transparent bridge (NTB) of the source computing host 620A may respectively transfer the host bus address (HBA) and the host physical address as 0x300 and 0x400 through the EPT 628A.

The source computing host 620A may transmit the configuration message related to the Rx ring buffer addresses in the EPT 628A to the destination computing host 620B after migrating the source virtual machine VM-A. The destination computing host 620B may remap the configuration message to the EPT 628B of the destination computing host 620B after receiving the configuration message. Table 2 shows the configuration message related to Rx ring buffer addresses in the EPT 628B of the destination computing host 620B.

TABLE 2

EPT 628B

Rx Ring Buffer Address HBA: 0 × 100
0 × 100 go to Hypervisor 626 B
Hypervisor 626 B transfers to HPA: 0 × 500
0 × 500 go to NTB2
NTB2 transfers to HBA of Computing Host 620B: 0 × 600
0 × 600 go to Hypervisor 626B
Hypervisor 626B transfers to HPA: 0 × 700
0 × 700 is Rx Ring Buffer Address of Computing Host 620B As shown in Table 2, the hypervisor 626B in the destination computing host 620B may compare the configuration information related to Rx ring buffer addresses in the EPR 628B with the configuration information transmitted by the source computing host 620A. When the hypervisor 626B detects that an address has been used in the EPT 628B, the hypervisor 626B reassigns a new address to the destination computing host 620B. For example, when addresses 0x400 and 0x300 have been used in the EPT 628B, the hypervisor 626B reassigns the host physical address as 0x700 and reallocates the host bus address as 0x600.

Figure 7:
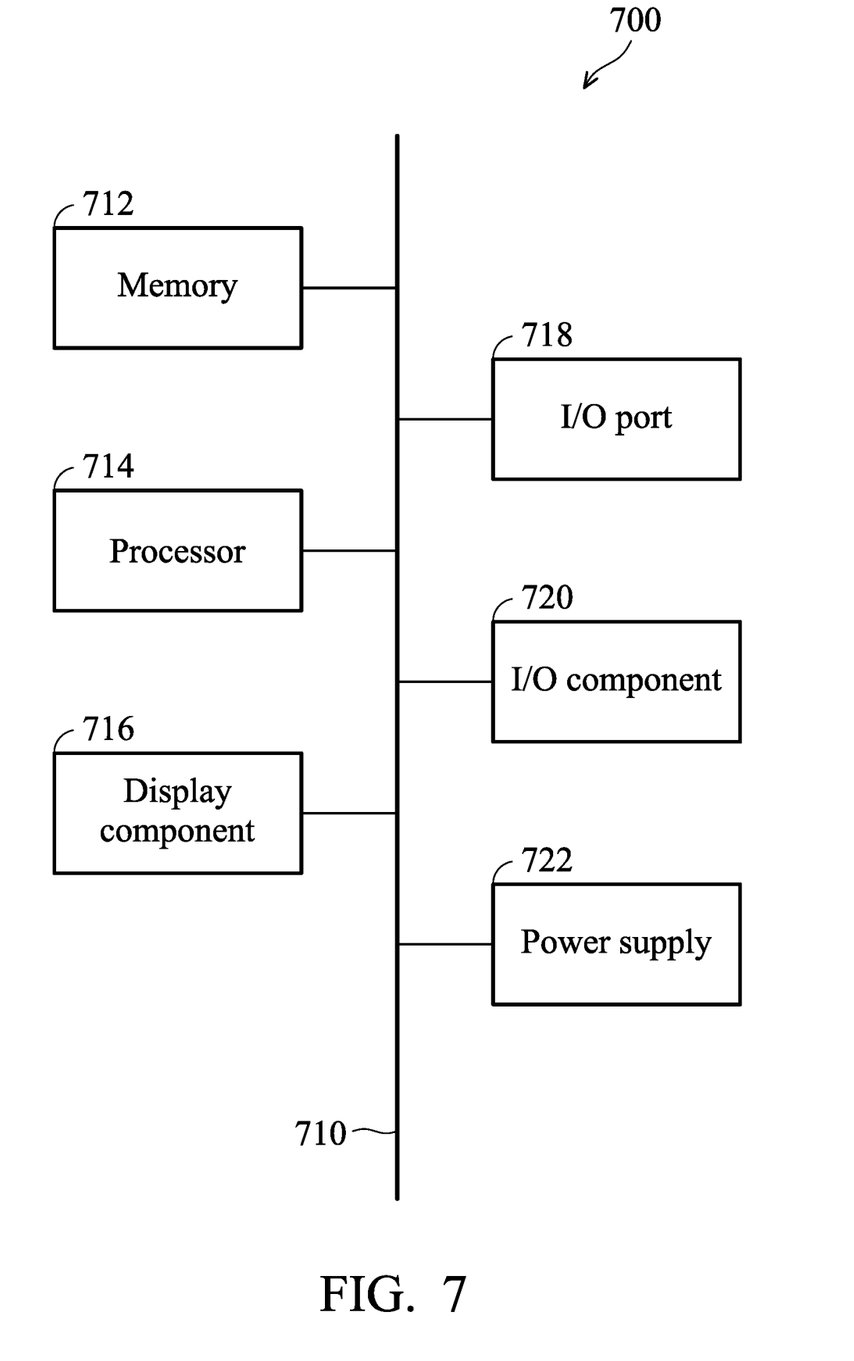
FIG. 7 is a flow diagram illustrating an exemplary operating environment according to an embodiment of the disclosure.

Having described embodiments of the present disclosure, an exemplary operating environment in which embodiments of the present disclosure may be implemented is described below. Referring to FIG. 7, an exemplary operating environment for implementing embodiments of the present disclosure is shown and generally known as a computing device 700. The computing device 700 is merely an example of a suitable computing environment and is not intended to limit the scope of use or functionality of the disclosure. For example, the computing device 700 may be a computing host (e.g., the compute host 120A, or the compute host 120B) or a management host 110 in the system 100 of FIG. 1. Neither should the computing device 700 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 7, the computing device 700 may include a bus 710 that directly or indirectly couples to the following devices: one or more memories 712, one or more processors 714, one or more display components 716, one or more input/output (I/O) ports 718, one or more input/output components 720, and an illustrative power supply 722. The bus 710 may represent one or more kinds of busses (such as an address bus, data bus, or any combination thereof). Although the various blocks of FIG. 7 are shown with lines for the sake of clarity, in reality, the boundaries of the various components are not specific. For example, the display component 716 such as a display device may be considered an I/O component and the processor 714 may include a memory.

The computing device 700 typically includes a variety of computer-readable media. The computer-readable media can be any available media that can be accessed by computing device 700 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 700. The computer storage media may not comprise signal per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 712 may include computer-storage media in the form of volatile and/or nonvolatile memory. The memory may be removable, non-removable, or a combination thereof. Exemplary hardware devices include solid-state memory, hard drives, optical-disc drives, etc. The computing device 700 includes one or more processors that read data from various entities such as the memory 712 or the I/O components 720. The presentation component(s) 716 present data indications to a user or other device. Exemplary presentation components include a display device, speaker, printing component, vibrating component, etc.

The I/O ports 718 allow the computing device 700 to be logically coupled to other devices including the I/O components 720, some of which may be embedded. Illustrative components include a microphone, joystick, game pad, satellite dish, scanner, printer, wireless device, etc. The I/O components 720 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the computing device 700, or any combination of. The computing device 700 may be equipped with depth cameras, such as stereoscopic camera systems, infrared camera systems, RGB camera systems, any combination of thereof to realize gesture detection and recognition. Furthermore, the computing device 700 may be equipped with accelerometers or gyroscopes that enable detection of motion. The output of the accelerometers or gyroscopes may be provided to the display of the computing device 700 to carry out immersive augmented reality or virtual reality.

Furthermore, the processor 714 in the computing device 700 can execute the program code in the memory 712 to perform the above-described actions and steps or other descriptions herein.

As shown above, since the same VF in the management host is assigned to the migrated VM after the live migration, the original driver resources and hardware status are completely preserved without any loss of hardware status by using the method and the device for live migration of a virtual machine in the MR-IOV environment, and the computing host thereof provided in the present disclosure.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for live migration of a virtual machine in a multi-root I/O virtualization (MR-IOV) environment, used in a system, wherein the system at least comprises a plurality of computing hosts, an MR-IOV device and a management host including a physical function (PF) and configured to implement a plurality of virtual functions (VF), and each computing host and the management host are communicatively coupled to the MR-IOV device, the method comprising:

migrating, by a source computing host of the computing hosts, a source virtual machine (VM) in the source computing host to a destination VM in a destination computing host of the computing hosts, wherein the source VM includes a source VF;

transmitting, by the destination computing host, a request message to a management host; and reassigning, by the management host, a first VF corresponding to the source VF in the management host to the destination VM according to the request message;

wherein after the source computing host migrates the source VM to the destination VM, the method further comprises:

transmitting, by the source computing host, a configuration message to the destination computing host; and remapping, by a hypervisor controlled by the destination computing host, the configuration information to an extended page table (EPT) of the destination computing host.

2. The method for live migration of a virtual machine in a multi-root I/O virtualization (MR-IOV) environment as claimed in claim 1, after the source computing host migrates the source VM to the destination VM, the method further comprising:

transmitting, by the source computing host, a notification message to the management host to notify the management host that the source computing host has de-allocated the source VM.

3. The method for live migration of a virtual machine in a multi-root I/O virtualization (MR-IOV) environment as claimed in claim 1, wherein the configuration information at least comprises:

peripheral component interconnection express (PCIe) ID;
configuration space;
control and status register (CSR) addresses;
Rx ring buffer addresses;
Tx ring buffer addresses;
Rx packet buffer addresses; and
Tx packet buffer addresses.

4. A system for live migration of a virtual machine in a multi-root I/O virtualization (MR-IOV) environment, comprising:

an MR-IOV device;
a plurality of computing hosts, wherein each computing host is communicatively coupled to the MR-IOV device via a peripheral component interconnection express (PCIe) link; and
a management host, comprising a physical function (PF) and configured to implement a plurality of virtual functions (VF), wherein the management host is communicatively coupled to the MR-IOV device via a PCIe slot of the MR-IOV device;
wherein a source computing host of the computing hosts migrates a source virtual machine (VM) in the source computing host to a destination VM in a destination computing host of the computing hosts, wherein the source VM includes a source VF;
the source computing host transmits a request message to the management host; and
the management host reassigns a first VF corresponding to the source VF in the management host to the destination VM according to the request message;
wherein after the source computing host migrates the source VM to the destination VM, the source computing host transmits a configuration message to the destination computing host, and a hypervisor controlled by the destination computing host remaps the configuration information to an extended page table (EPT) of the destination computing host.

5. The system for live migration of a virtual machine in a multi-root I/O virtualization (MR-IOV) environment as claimed in claim 4, after the source computing host migrates the source VM to the destination VM, the source computing host transmits a notification message to the management host to notify the management host that the source computing host has de-allocated the source VM.

6. The system for live migration of a virtual machine in a multi-root I/O virtualization (MR-IOV) environment as claimed in claim 4, wherein the configuration information at least comprises:
PCIe ID;
configuration space;
control and status register (CSR) addresses;
Rx ring buffer addresses;
Tx ring buffer addresses;
Rx packet buffer addresses; and
Tx packet buffer addresses.

7. A method for live migration of a virtual machine in a multi-root I/O virtualization (MR-IOV) environment, used in a computing host, wherein the method comprises:
controlling a hypervisor to migrate a source virtual machine (VM) including a source virtual function (VF) in the computing host to a destination VM in a destination computing host; and
transmitting a configuration message to the destination computing host,
wherein the computing host and the destination computing host are coupled to an MR-IOV device to communicate with a management host;
remapping, by the hypervisor controlled by the destination computing host, the configuration information to an extended page table (EPT) of the destination computing host.

8. The method for live migration of a virtual machine in a multi-root I/O virtualization (MR-IOV) environment as claimed in claim 7, wherein after migrating the source VM to the destination VM, the method further comprises:
transmitting a notification message to the management host to notify the management host that the source computing host has de-allocated the source VM.

9. The method for live migration of a virtual machine in a multi-root I/O virtualization (MR-IOV) environment as claimed in claim 7, wherein the configuration information at least comprises:
peripheral component interconnection express (PCIe) ID;
configuration space;
control and status register (CSR) addresses;
Rx ring buffer addresses;
Tx ring buffer addresses;
Rx packet buffer addresses; and
Tx packet buffer addresses.

10. A computing host for live migration of a virtual machine in a multi-root I/O virtualization (MR-IOV) environment, comprising:
one or more processors; and
one or more computer storage media, storing one or more computer-readable instructions, wherein the processor is configured to drive the computer storage media to execute the following tasks:
controlling a hypervisor to migrate a source virtual machine (VM) including a source virtual function (VF) in the computing host to a destination VM in a destination computing host; and
transmitting a configuration message to the destination computing host,
wherein the computing host and the destination computing host are coupled to an MR-IOV device to communicate with a management host;
remapping, by the hypervisor controlled by the destination computing host, the configuration information to an extended page table (EPT) of the destination computing host.

11. The computing host for live migration of a virtual machine in a multi-root I/O virtualization (MR-IOV) environment as claimed in claim 10, wherein after migrating the source VM to the destination VM, the processor further executes the following tasks:
transmitting a notification message to the management host to notify the management host that the source computing host has de-allocated the source VM.

12. The method for live migration of a virtual machine in a multi-root I/O virtualization (MR-IOV) environment as claimed in claim 10, wherein the configuration information at least comprises:
PCIe ID;
configuration space;
control and status register (CSR) addresses;
Rx ring buffer addresses;
Tx ring buffer addresses;
Rx packet buffer addresses; and
Tx packet buffer addresses.

13. A method for live migration of a virtual machine in a multi-root I/O virtualization (MR-IOV) environment, used in a computing host, comprising:
controlling a hypervisor to migrate a source virtual machine (VM) including a source virtual function (VF) in a source computing host to a destination VM in the computing host;
transmitting a request message to a management host to request the management host to reassign a first VF corresponding to the source VF in the management host to the destination VM according to the request message,
wherein the source computing host and the computing host are coupled to an MR-IOV device to communicate with the management host;
wherein after migrating the source VM to the destination VM, the method further comprises:
receiving a configuration message from the source computing host; and
remapping the configuration information to an extended page table (EPT) of the destination computing host.

14. The method for live migration of a virtual machine in a multi-root I/O virtualization (MR-IOV) environment as claimed in claim 13, wherein the configuration information at least comprises:
peripheral component interconnection express (PCIe) ID;
configuration space;
control and status register (CSR) addresses;
Rx ring buffer addresses;
Tx ring buffer addresses;
Rx packet buffer addresses; and
Tx packet buffer addresses.

15. A computing host for live migration of a virtual machine in a multi-root I/O virtualization (MR-IOV) environment, comprising:
one or more processors; and
one or more computer storage media, storing one or more computer-readable instructions, wherein the processor is configured to drive the computer storage media to execute the following tasks:
controlling a hypervisor to migrate a source virtual machine (VM) including a source virtual function (VF) in a source computing host to a destination VM in the computing host;
transmitting a request message to a management host to request the management host to reassign a first VF corresponding to the source VF in the management host to the destination VM according to the request message, wherein the source computing host and the computing host are coupled to an MR-IOV device to communicate with the management host;

after migrating the source VM to the destination VM, the processor further executes the following tasks:
  receiving a configuration message from the source computing host; and
  remapping the configuration information to an extended page table (EPT) of the destination computing host.

16. The computing host for live migration of a virtual machine in a multi-root I/O virtualization (MR-IOV) environment as claimed in claim 15, wherein the configuration information at least comprises:
  peripheral component interconnection express (PCIe) ID;
  configuration space;
  control and status register (CSR) addresses;
  Rx ring buffer addresses;
  Tx ring buffer addresses;
  Rx packet buffer addresses; and
  Tx packet buffer addresses.

* * * * *